US012776741B2

(12) United States Patent
Aoki

(10) Patent No.: US 12,776,741 B2
(45) Date of Patent: Oct. 27, 2026

(54) MOTOR DRIVE CONTROL DEVICE AND MOTOR DRIVE CONTROL METHOD

(71) Applicant: MINEBEA MITSUMI Inc., Kitasaku-gun (JP)

(72) Inventor: Masato Aoki, Kitasaku-gun (JP)

(73) Assignee: MINEBEA MITSUMI INC., Nagano (JP)

( * ) Notice: Subject to any disclaimer, the term of this patent is extended or adjusted under 35 U.S.C. 154(b) by 214 days.

(21) Appl. No.: 18/721,788

(22) PCT Filed: Oct. 27, 2022

(86) PCT No.: PCT/JP2022/040110
§ 371 (c)(1),
(2) Date: Jun. 19, 2024

(87) PCT Pub. No.: WO2023/119863
PCT Pub. Date: Jun. 29, 2023

(65) Prior Publication Data

US 2025/0119091 A1 Apr. 10, 2025

(30) Foreign Application Priority Data

Dec. 23, 2021 (JP) ................................ 2021-209247

(51) Int. Cl.
*H02P 27/08* (2006.01)
*H02P 29/50* (2016.01)

(52) U.S. Cl.
CPC ............ *H02P 29/50* (2016.02); *H02P 27/085* (2013.01)

(58) Field of Classification Search
CPC ......... H02P 27/08; H02P 27/085; H02P 29/50
See application file for complete search history.

(56) References Cited

U.S. PATENT DOCUMENTS 11,088,646 B2 * 8/2021 Aoki ....................... H02P 23/14
11,196,378 B2 * 12/2021 Suehiro ............... H02M 7/5387
(Continued)

FOREIGN PATENT DOCUMENTS

JP 2016-185021 A 10/2016
WO WO-2018037454 A1 * 3/2018 ............. H02P 27/08

OTHER PUBLICATIONS

International Search Report for corresponding International Application No. PCT/JP2022/040110 mailed Jan. 17, 2023.
(Continued)

*Primary Examiner* — Thai T Dinh
(74) *Attorney, Agent, or Firm* — Chrisman Gallo Tochtrop LLC

(57) ABSTRACT

To provide a motor drive control device and a motor drive control method capable of achieving high motor drive efficiency and suppressing the occurrence of vibration. A motor drive control device includes a control circuit unit configured to output a drive control signal (Sd) for PWM-driving a motor, and a motor drive unit configured to drive the motor based on the drive control signal (Sd). The control circuit unit adjusts a PWM frequency of the drive control signal (Sd) such that the PWM frequency is in a predetermined range and the number of PWM pulses per one cycle of an electrical angle of the motor is a desired value in a first rotation speed range of predetermined rotation speed ranges of the motor, and the PWM frequency is in the predetermined range in a rotation speed range other than the first rotation speed range.

10 Claims, 6 Drawing Sheets

(56) References Cited

U.S. PATENT DOCUMENTS

| | | | | |
|---|---|---|---|---|
| 2020/0259444 | A1 * | 8/2020 | Aoki | H02P 6/16 |
| 2020/0295697 | A1 * | 9/2020 | Suehiro | H02P 27/08 |
| 2021/0203263 | A1 * | 7/2021 | Serrano | H02P 27/08 |

OTHER PUBLICATIONS

Written Opinion for corresponding International Application No. PCT/JP2022/040110 dated Jan. 17, 2023 and English translation.

* cited by examiner

MOTOR DRIVE CONTROL DEVICE AND MOTOR DRIVE CONTROL METHOD

CROSS-REFERENCE TO RELATED APPLICATIONS

This application is a national stage entry of International Application No. PCT/JP2022/040110 filed on Oct. 27, 2022, which claims the benefit of priority to Japanese Application No. 2021-209247, filed Dec. 23, 2021, the entire disclosures of which are hereby incorporated herein by reference.

TECHNICAL FIELD

The present invention relates to a motor drive control device and a motor drive control method capable of achieving high motor drive efficiency and suppressing the occurrence of vibration.

BACKGROUND ART

In sine wave drive control of a motor, to achieve both the suppression of vibration and the improvement of drive efficiency of the motor, it is preferable to bring current flowing through a winding close to a smooth ideal sine wave waveform. To realize this, it is desirable to control the number of PWM pulses per one cycle of an electrical angle of the motor (hereinafter, also simply referred to as "the number of pulses") to a predetermined range including a desired value in a predetermined rotation speed range of the motor. This will be described below.

FIG. 1 is a diagram for explaining the number of PWM pulses per one cycle of an electrical angle.

FIG. 1(*a*) illustrates a waveform of one cycle of an electrical angle of a Hall signal Hu output by a U-phase Hall sensor in a three phase motor, for example. The number of PWM pulses is desirably controlled to a desired number of pulses per one cycle of the electrical angle of the motor illustrated in this figure, for example, about 100 pulses as illustrated in FIG. 1(*b*). On the other hand, as illustrated in FIG. 1(*c*), for example, when the number of PWM pulses per one cycle of the electrical angle is 33 pulses, a smooth sine wave waveform cannot be generated due to a shortage of the number of pulses, controllability deteriorates, and vibration occurs. On the other hand, as illustrated in FIG. 1(*d*), when the number of PWM pulses per one cycle of the electrical angle is 400 pulses, the switching loss of the switching element of the inverter circuit increases with respect to 100 pulses being the desired number of pulses due to an excessive number of pulses, and the drive efficiency of the motor decreases.

When the PWM frequency is fixed, there is a problem that the number of PWM pulses per one cycle of the electrical angle greatly increases or decreases because the time of one cycle of the electrical angle also changes with a change in the rotation speed in a predetermined rotation speed range of the motor. Here, the PWM frequency is a carrier frequency of a PWM signal in PWM control.

FIG. 2 is a diagram illustrating a change in the number of PWM pulses per one cycle of the electrical angle when the PWM frequency is fixed in the related art. In the present embodiment, the predetermined rotation speed range of the motor is described as being 2000 rpm or more and 30000 rpm or less.

As illustrated in FIG. 2(*a*), when the PWM frequency is fixed to 20 kHz, the number of PWM pulses is 200 at the time of low-speed rotation (2000 rpm), but the number of PWM pulses is 13 at the time of high-speed rotation (30000 rpm). The number of pulses is insufficient as compared with a desired number of pulses (for example, about 100 pulses), and thus a smooth sine wave waveform cannot be generated and vibration occurs.

On the other hand, as illustrated in FIG. 2(*b*), when the PWM frequency is fixed to 96 kHz, the number of PWM pulses is 96 at the time of high-speed rotation (30000 rpm), but the number of PWM pulses is 960 at the time of low-speed rotation (2000 rpm). The number of pulses is excessive as compared with a desired number of pulses (for example, about 100 pulses), and thus the drive efficiency of the motor decreases.

Note that 100 pulses shown above is an example of a desired number of pulses, and the number of pulses is not limited to this.

Patent Document 1 discloses an inverter device. In the inverter device, the number of PWM pulses per one cycle of an electrical angle is constant over the entire rotation speed range.

CITATION LIST

Patent Literature

Patent Document 1: JP 2016-185021 A

SUMMARY OF INVENTION

Technical Problem

However, in the inverter device of Patent Document 1, when the PWM frequency is increased to, for example, 150 kHz or more at the time of high-speed rotation, there are problems that the switching loss of the switching element of the inverter circuit increases, and the drive efficiency of the motor decreases. On the other hand, when the PWM frequency is reduced to less than 16 kHz (an example of the audible range) at the time of low-speed rotation, there is a problem that noise capable of being heard by human hearing is generated.

Accordingly, it is an object of the present invention to provide a motor drive control device and a motor drive control method capable of achieving high motor drive efficiency and suppressing the occurrence of vibration by adjusting a PWM frequency to fall within a predetermined range and setting the number of PWM pulses per one cycle of an electrical angle of the motor to a desired value in accordance with one rotation speed range of predetermined rotation speed ranges of the motor.

Solution to Problem

A motor drive control device of the present invention includes:

a control circuit unit configured to output a drive control signal for PWM-driving a motor; and a motor drive unit configured to drive the motor based on the drive control signal, wherein the control circuit unit adjusts a PWM frequency of the drive control signal such that the PWM frequency is within a predetermined range and the number of PWM pulses per one cycle of an electrical angle of the motor is a desired value in a first rotation speed range of predetermined rotation speed ranges of the motor, and the PWM frequency is within the predetermined range in a rotation speed range other than the first rotation speed range.

In the present invention, the control circuit unit preferably adjusts the PWM frequency to a first value or more in the predetermined rotation speed ranges.

In the present invention, the first value of the PWM frequency is preferably a frequency in an inaudible range incapable of being heard by human hearing.

In the present invention, it is preferable that the control circuit unit adjusts the PWM frequency to be equal to or less than a second value greater than the first value in the predetermined rotation speed ranges.

In the present invention, the second value of the PWM frequency is preferably a frequency, and a drive efficiency of the motor is maintainable at a predetermined value or more at the frequency.

In the present invention, the control circuit unit preferably includes:

a storage unit configured to store a parameter for adjusting the PWM frequency; and a PWM frequency determination unit configured to determine the PWM frequency to be adjusted based on the parameter.

In the present invention, the parameter stored in the storage unit preferably includes:

a designated number of pulses being a predetermined number of PWM pulses per the one cycle of an electrical angle;

a minimum PWM cycle set value corresponding to the first value of the PWM frequency; and a maximum PWM cycle set value corresponding to the second value of the PWM frequency.

In the present invention, the PWM frequency determination unit preferably includes: acquiring the one cycle of an electrical angle based on a position detection signal indicating a rotation position of the motor;

calculating a target PWM cycle set value corresponding to a target PWM frequency based on the one cycle of an electrical angle and the designated number of pulses;

comparing a current PWM cycle set value corresponding to a current PWM frequency with the target PWM cycle set value;

when the current PWM cycle set value and the target PWM cycle set value do not match, comparing the target PWM cycle set value with the minimum PWM cycle set value and the maximum PWM cycle set value;

correcting the target PWM cycle set value based on a comparison result; and determining the PWM frequency by adjusting the current PWM cycle set value based on the target PWM cycle set value corrected.

In the present invention, the PWM frequency determination unit preferably includes:

correcting the minimum PWM cycle set value to the target PWM cycle set value when the target PWM cycle set value is larger than the minimum PWM cycle set value; and correcting the maximum PWM cycle set value to the target PWM cycle set value when the target PWM cycle set value is smaller than the maximum PWM cycle set value.

In the present invention, the parameter stored in the storage unit preferably includes:

a designated change time for setting an adjustment interval of the PWM frequency; and a designated change amount for setting an adjustment amount of the PWM frequency.

In the present invention, the PWM frequency determination unit preferably includes:

a designated time measurement unit configured to determine whether the designated change time has elapsed;

a cycle acquisition unit configured to acquire the one cycle of an electrical angle;

a target PWM cycle set value calculation unit configured to calculate the target PWM cycle set value;

a target PWM cycle set value correction unit configured to correct the target PWM cycle set value; and a current PWM cycle set value adjustment unit configured to adjust the current PWM cycle set value based on the designated change amount for each of a plurality of the designated change times.

In the present invention, the control circuit unit preferably includes a PWM command unit configured to generate a PWM set instruction signal based on a target rotation speed of the motor, an actual rotation speed of the motor, and the PWM frequency, and the PWM frequency determination unit sets the designated change time and the designated change amount such that a timing when the PWM command unit generates the PWM set instruction signal and a timing when the PWM frequency is determined are synchronized with each other.

A motor drive control method of the present invention is a motor drive control method executed by a motor drive control device, the motor drive control device including:

a control circuit unit configured to output a drive control signal for PWM-driving a motor; and a motor drive unit configured to drive the motor based on the drive control signal, the motor drive control method including:

adjusting a PWM frequency of the drive control signal such that the PWM frequency is within a predetermined range and the number of PWM pulses per one cycle of an electrical angle of the motor is a desired value in a first rotation speed range of predetermined rotation speed ranges of the motor, and the PWM frequency is within the predetermined range in a rotation speed range other than the first rotation speed range.

Advantageous Effects of Invention

The present invention can provide a motor drive control device and a motor drive control method capable of achieving high motor drive efficiency and suppressing the occurrence of vibration by adjusting a PWM frequency to fall within a predetermined range and setting the number of PWM pulses per one cycle of an electrical angle of the motor to a desired value in accordance with one rotation speed range of predetermined rotation speed ranges of the motor.

DESCRIPTION OF EMBODIMENTS

Figure 1:
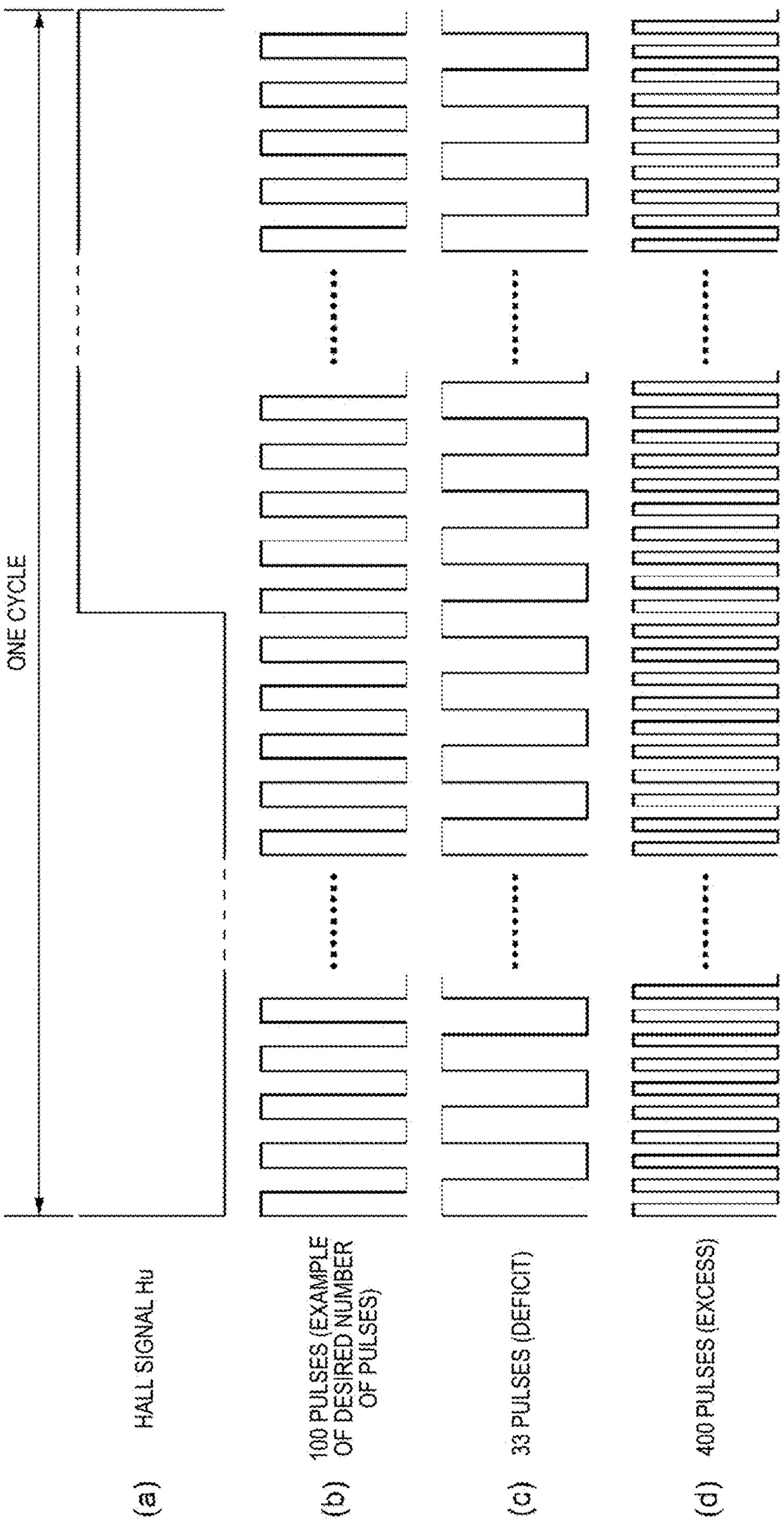
FIG. 1 is a diagram for explaining the number of PWM pulses per one cycle of an electrical angle.
Figure 2:
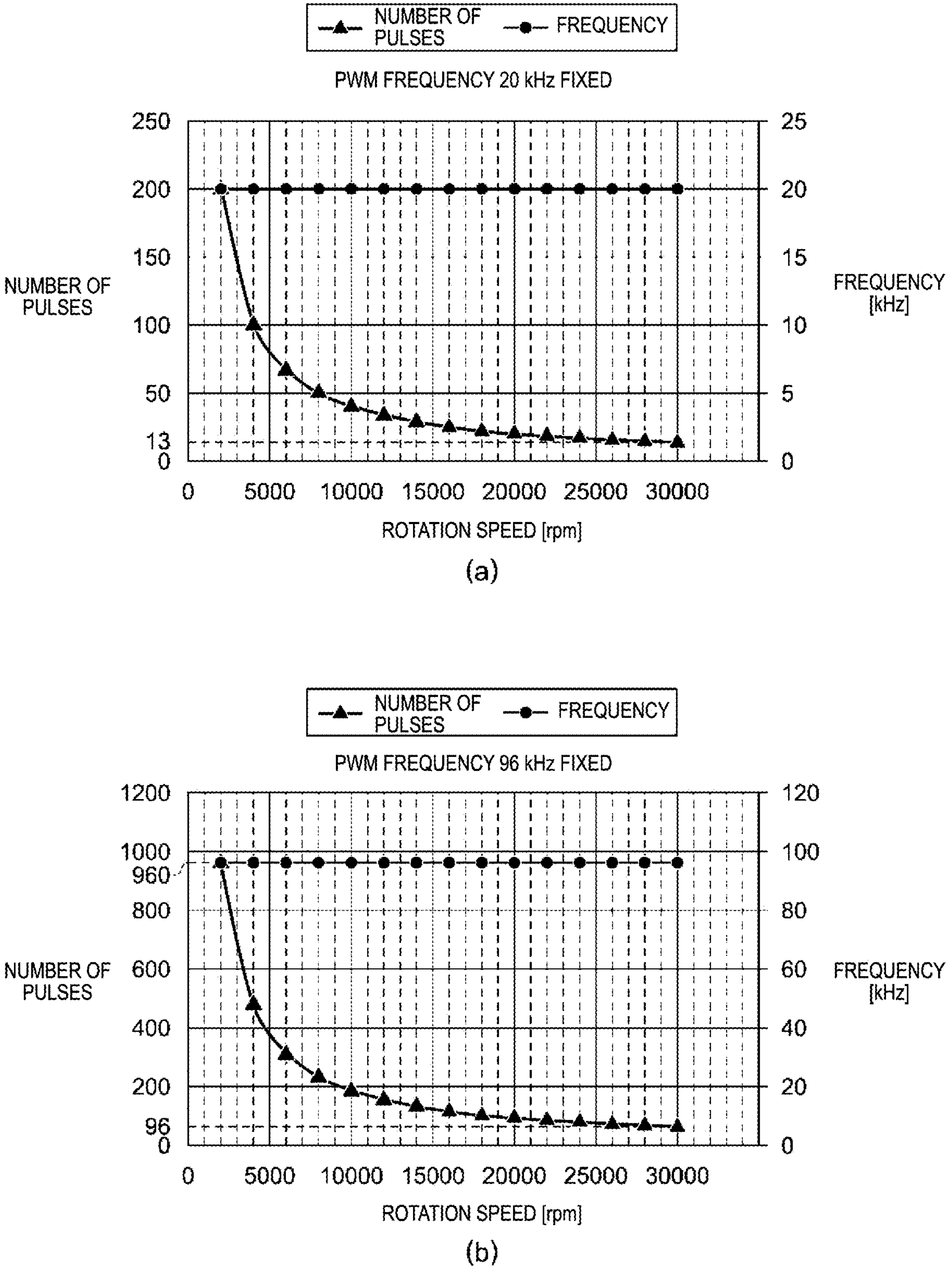
FIG. 2 is a diagram illustrating a change in the number of PWM pulses per one cycle of an electrical angle when a PWM frequency is fixed in the related art.
Figure 3:
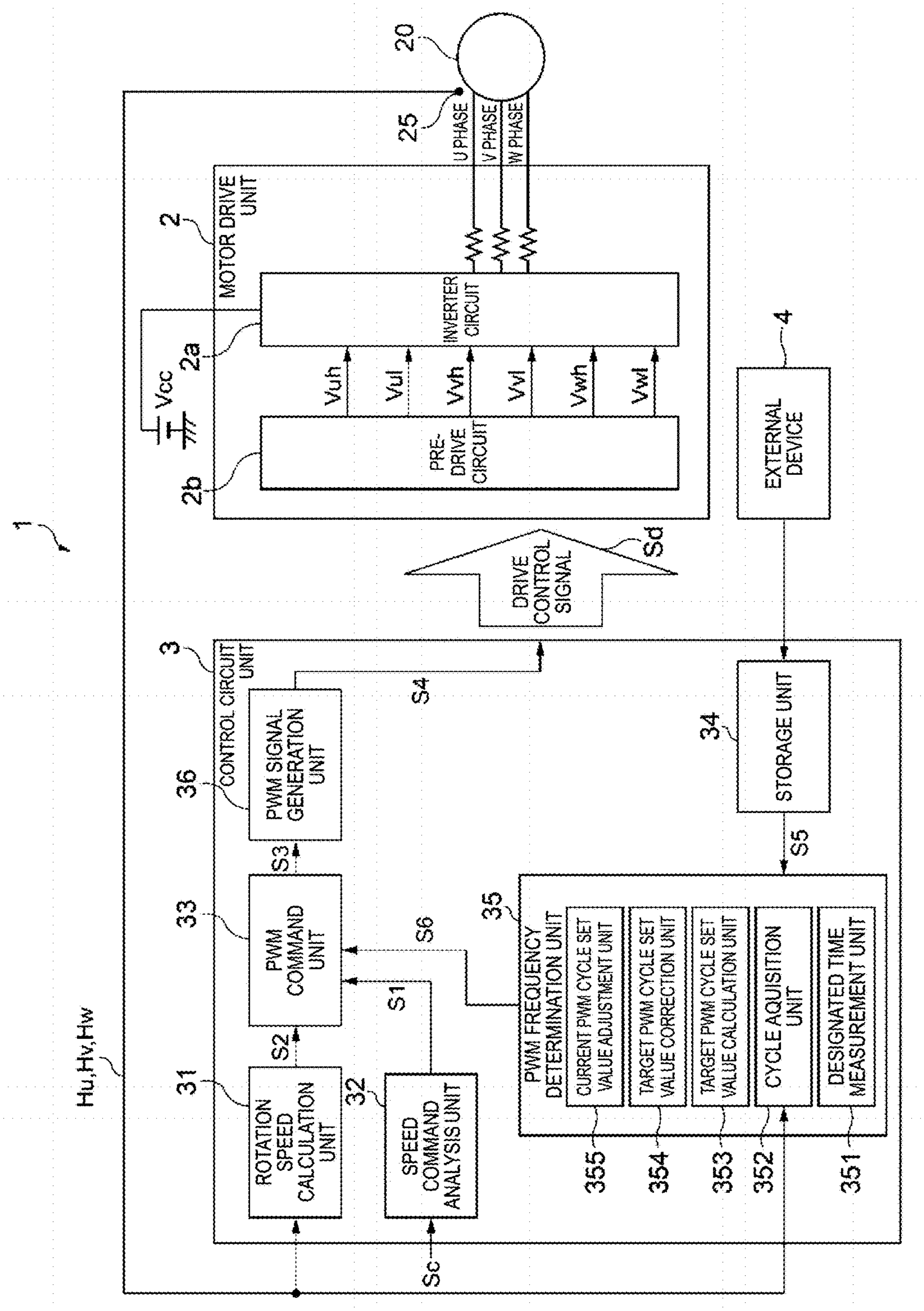
FIG. 3 is a diagram illustrating a circuit configuration of a motor drive control device according to an embodiment of the present invention.

FIG. 3 is a diagram illustrating a circuit configuration of a motor drive control device according to an embodiment of the present invention.

A motor drive control device 1 includes a motor drive unit 2 and a control circuit unit 3.

The motor drive unit 2 outputs a drive signal to a motor 20 based on a drive control signal Sd output from the control circuit unit 3 to PWM-drive the motor 20.

The control circuit unit 3 adjusts a PWM frequency so that the PWM frequency of the drive control signal is in a predetermined range and the number of PWM pulses per one cycle of an electrical angle of the motor 20 is a desired value in a first rotation speed range of predetermined rotation speed ranges of the motor 20, and the PWM frequency is in a predetermined range in rotation speed ranges other than the first rotation speed range.

The motor 20 is, for example, a three-phase brushless motor, but is not limited to the three-phase brushless motor.

The motor drive unit 2 includes an inverter circuit 2*a* and a pre-drive circuit 2*b*.

The inverter circuit 2*a* includes, for example, six switching elements (not illustrated), and supplies alternating current power to coils of three phases of the motor 20. Three high-side switching elements among the six switching elements are disposed at a positive electrode side of a power supply Vcc, and the remaining three low-side switching elements are disposed at a negative electrode side of the power supply Vcc.

The pre-drive circuit 2*b* includes six output terminals connected to respective gate terminals of the six switching elements of the inverter circuit 2*a*. The pre-drive circuit 2*b* outputs PWM drive signals Vuh, Vul, Vvh, Vvl, Vwh, and Vwl for each of the high side and low side of the three phases (U phase, V phase, W phase), based on a drive control signal Sd output from the control circuit unit 3, and controls an on/off operation of the switching elements.

In the motor 20, three Hall elements (one example of position detection sensors, collectively referred to as Hall element 25) are disposed corresponding to the coils of the three phases. The Hall element 25 detects a magnetic pole of a rotor, and outputs Hall signals Hu, Hv, Hw corresponding to a rotation position of the rotor. The Hall signals Hu, Hv, Hw are input to the control circuit unit 3.

Note that the position detection sensor is not limited to the Hall element as long as the position detection sensor outputs a position detection signal indicating the rotation position of the rotor, and is not limited to three even when the Hall element is used. The motor drive control device 1 may be of a position sensorless type without the position detection sensor.

The control circuit unit 3 is, for example, a microcomputer, and performs PWM control on the motor drive unit 2. For example, a speed command signal Sc instructing the target rotation speed of the motor 20 is input from the outside to the control circuit unit 3. The control circuit unit 3 includes a rotation speed calculation unit 31, a speed command analysis unit 32, a PWM command unit 33, a storage unit 34, a PWM frequency determination unit 35, and a PWM signal generation unit 36.

The rotation speed calculation unit 31 generates an actual rotation speed signal S2 indicating an actual rotation speed of the motor 20 based on the input Hall signals Hu, Hv, Hw, and outputs the actual rotation speed signal S2 to the PWM command unit 33. The actual rotation speed signal S2 includes a position signal indicating a positional relationship between each phase and the rotor and actual rotation speed information corresponding to a cycle of the position signal.

The speed command analysis unit 32 generates a target rotation speed signal S1 indicating a target rotation speed of the motor 20 based on the input speed command signal Sc and outputs the target rotation speed signal S1 to the PWM command unit 33. The target rotation speed signal S1 is a PWM signal indicating a duty ratio corresponding to the speed command signal Sc.

The storage unit 34 is a functional unit configured to store a parameter input from an external device 4 (for example, a personal computer), and the parameter is information for adjusting the PWM frequency. The parameters include a designated number of pulses, a minimum PWM cycle set value PsMin, a maximum PWM cycle set value PsMax, a designated change time, a designated change amount, and one count time.

The values of the parameters are as shown in Table 1 in the present embodiment, but are not limited to the values in Table 1.

These parameters are referred to by the PWM frequency determination unit 35 as parameter information S5.

TABLE 1

| | |
|---|---|
| Designated number of pulses | 100 pulses |
| Minimum PWM cycle set value PsMin | 2000 count (corresponding to PWM frequency 20 kHz) |
| Maximum PWM cycle set value PsMax | 416 count (corresponding to PWM frequency 96 kHz) |
| Designated change time | 10 ms |
| Designated change amount | 1 (@ 0.025 μs) |
| 1 count time | 0.025 μs |

The designated number of pulses is a predetermined number of PWM pulses (desired value) per one cycle of the electrical angle.

The PWM cycle set value is obtained by the following calculation formula.

$$\text{PWM cycle set value}=1/(1\text{ count time}\times\text{PWM frequency})$$

The minimum PWM cycle set value PsMin is a count value corresponding to the first value being the lower limit value of the PWM frequency. The minimum PWM cycle set value PsMin in the present embodiment is 2000 counts, and the first value of the PWM frequency is a frequency in an inaudible range incapable of being heard by human hearing (in the present embodiment, 20 kHz as an example). That is, the first value of the PWM frequency is not limited to 20 kHz as long as the first value is not perceived as noise by human hearing.

The maximum PWM cycle set value PsMax is an upper limit of the PWM frequency and is a count value corresponding to a second value larger than the first value. The maximum PWM cycle set value PsMax in the present embodiment is 416 counts, the second value of the PWM frequency is a frequency (96 kHz as a concrete example in the present embodiment), and the drive efficiency of the motor can be maintained at a predetermined value or more at the frequency. That is, the second value of the PWM frequency is not limited to 96 kHz but may be any value as long as the frequency satisfies a desired drive efficiency of the motor.

As described above, the predetermined range (the lower limit value and the upper limit value) of the PWM frequency is set based on the minimum PWM cycle set value PsMin and the maximum PWM cycle set value PsMax.

The designated change time is a time for setting the adjustment interval of the PWM frequency, and is set to 10 ms in the present embodiment.

The designated change amount is a value for setting the adjustment amount of the PWM frequency, and is set to "1" per one count time in the present embodiment.

One count time is a count time required for the timer in the PWM command unit 33 to output a predetermined PWM frequency, and is set to 0.025 us in the present embodiment.

Note that, the values of the designated change time, the designated change amount, and the one count time can be set as appropriate based on the operation specification of the motor 20 or the like.

The PWM frequency determination unit 35 includes a designated time measurement unit 351, a cycle acquisition unit 352, a target PWM cycle set value calculation unit 353, a target PWM cycle set value correction unit 354, and a current PWM cycle set value adjustment unit 355, and determines a PWM frequency based on a parameter referred to from the storage unit 34.

Hereinafter, the processing of the PWM frequency determination unit 35 will be described with reference to FIGS. 3 and 4.

Figure 4:
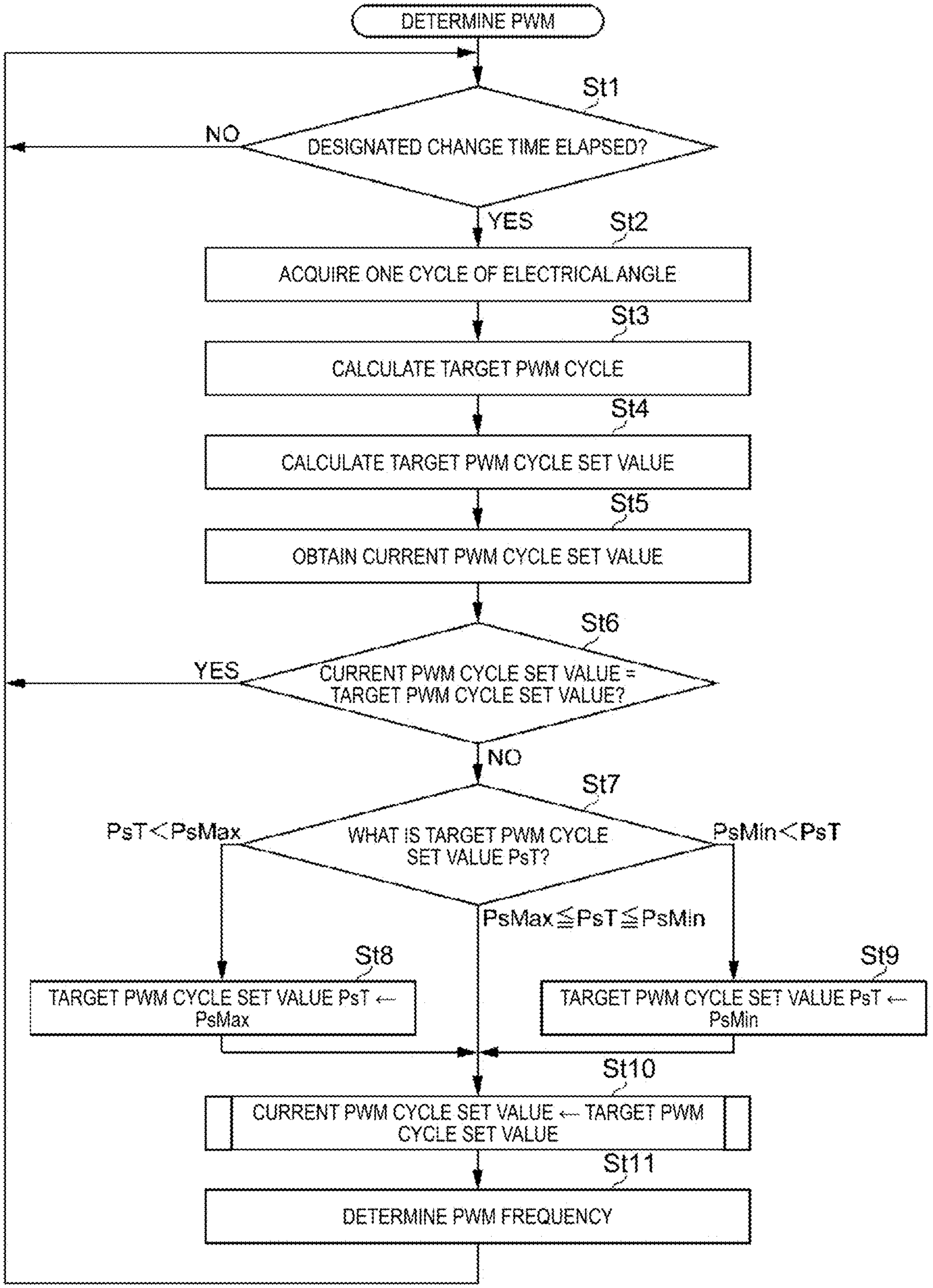
FIG. 4 is a flowchart illustrating an example of a PWM frequency determination processing procedure performed by a PWM frequency determination unit.

FIG. 4 is a flowchart illustrating an example of a determination processing procedure of a PWM frequency by the PWM frequency determination unit.

The designated time measurement unit 351 includes a timer to measure the designated change time referred to from the storage unit 34.

In step St1 of FIG. 4, the designated time measurement unit 351 determines whether or not the designated change time has elapsed.

In the present embodiment, as shown in Table 1, the designated change time stored in the storage unit 34 is 10 ms.

Note that the designated change time is 10 ms as a concrete example, and is not limited to this value. Note that if the designated change time is too short, the adjustment occurs frequently, whereas if the designated change time is too long, the time until the determination processing of the PWM frequency is completed is long. Therefore, in consideration of these, the designated change time is set to an appropriate value.

When the designated change time has not elapsed (NO in step St1), the determination processing in step St1 is repeated until the designated change time elapses.

On the other hand, when the designated change time has elapsed (YES in step St1), in step St2, the cycle acquisition unit 352 acquires one cycle of the electrical angle of the motor 20 based on the position detection signal indicating the rotation position of the motor 20, to be specific, based on the input Hall signals Hu, Hv, Hw, and outputs the acquired one cycle of the electrical angle to the target PWM cycle set value calculation unit 353.

In the present embodiment, one cycle of the electrical angle is 3750 μs.

In step St3, the target PWM cycle set value calculation unit 353 calculates the target PWM cycle based on one cycle of the electrical angle and the designated number of pulses (the number of pulses for desired value) referred to from the storage unit 34.

In the present embodiment, the target PWM period=one cycle of an electrical angle (3750 μs)÷the designated number of pulses (100 pulses)=37.5 μs.

In step St4, the target PWM cycle set value calculation unit 353 calculates the target PWM cycle set value PsT corresponding to the target PWM frequency based on the target PWM cycle and the one count time referred to from the storage unit 34, and outputs the target PWM cycle set value PsT to the target PWM cycle set value correction unit 354.

In the present embodiment, the target PWM cycle set value PsT=the target PWM cycle (37.5 μs)÷one count time (0.025 μs)=1500 counts.

In step St5, the current PWM cycle set value adjustment unit 355 acquires the current PWM cycle set value PsC corresponding to the current PWM frequency.

In the first flow, the current PWM cycle set value adjustment unit 355 sets the maximum PWM cycle set value PsMax referred to from the storage unit 34 as the current PWM cycle set value PsC, and outputs the current PWM cycle set value PsC to the target PWM cycle set value correction unit 354.

In the present embodiment, the current PWM cycle set value PsC is 416 counts.

In the second and subsequent flows, the current PWM cycle set value adjustment unit 355 uses the "current PWM cycle set value PsC" adjusted in step St10 described later.

Note that, as a new parameter, the initial value of the current PWM cycle set value PsC may be stored in the storage unit 34.

In step St6, the target PWM cycle set value correction unit 354 compares the current PWM cycle set value PsC with the target PWM cycle set value PsT.

When the current PWM cycle set value PsC and the target PWM cycle set value PsT match (YES in step St6), the process returns to the determination process in step St1.

On the other hand, when the current PWM cycle set value PsC and target PWM cycle set value PsT do not match (NO in step St6), the process proceeds to step St7.

In the present embodiment, since the current PWM cycle set value PsC (416 counts) and the target PWM cycle set value PsT (1500 counts) do not match, the process proceeds to step St7.

In step St7, the target PWM cycle set value correction unit 354 compares the target PWM cycle set value PST with the minimum PWM cycle set value PsMin and the maximum PWM cycle set value PsMax referred to from the storage unit 34.

In the present embodiment, the target PWM cycle set value PsT is 1500 counts, the minimum PWM cycle set value PsMin is 2000 counts, and the maximum PWM cycle set value PsMax is 416 counts. Therefore, the maximum PWM cycle set value PsMax (416 counts)≤the target PWM cycle set value PsT (1500 counts)≤the minimum PWM cycle set value PsMin (2000 counts) is established, and the target PWM cycle set value correction unit 354 outputs the target PWM cycle set value PsT (1500 counts) to the current PWM cycle set value adjustment unit 355.

In step St7, when the target PWM cycle set value PsT<the maximum PWM cycle set value PsMax (when the target PWM frequency is larger than the maximum PWM frequency), the process proceeds to step St8.

In step St8, the target PWM cycle set value correction unit 354 corrects the target PWM cycle set value PST to the maximum PWM cycle set value PsMax.

Correcting the target PWM cycle set value PST to the maximum PWM cycle set value PsMax means adjusting the PWM frequency to the second value (96 kHz in the present embodiment) or less.

In step St7, when the minimum PWM cycle set value PsMin<the target PWM cycle set value PsT (when the target PWM frequency is smaller than the minimum PWM frequency), the process proceeds to step St9.

In step St9, the target PWM cycle set value correction unit 354 corrects the minimum PWM cycle set value PsMin to the target PWM cycle set value PsT.

Correcting the target PWM cycle set value PST to the minimum PWM cycle set value PsMin means adjusting the PWM frequency to the first value (20 kHz in the present embodiment) or more.

In this way, the target PWM cycle set value correction unit 354 corrects the target PWM cycle set value PsT in steps St8 and St9 based on the comparison result in step St7, and outputs the corrected target PWM cycle set value PST to the current PWM cycle set value adjustment unit 355.

In step St10, the current PWM cycle set value adjustment unit 355 adjusts the current PWM cycle set value PsC based on the corrected target PWM cycle set value PsT.

In the present embodiment, the current PWM cycle set value PsC is adjusted so that the current PWM cycle set value PsC (416 counts) becomes the target PWM cycle set value PsT (1500 counts).

Figure 5:
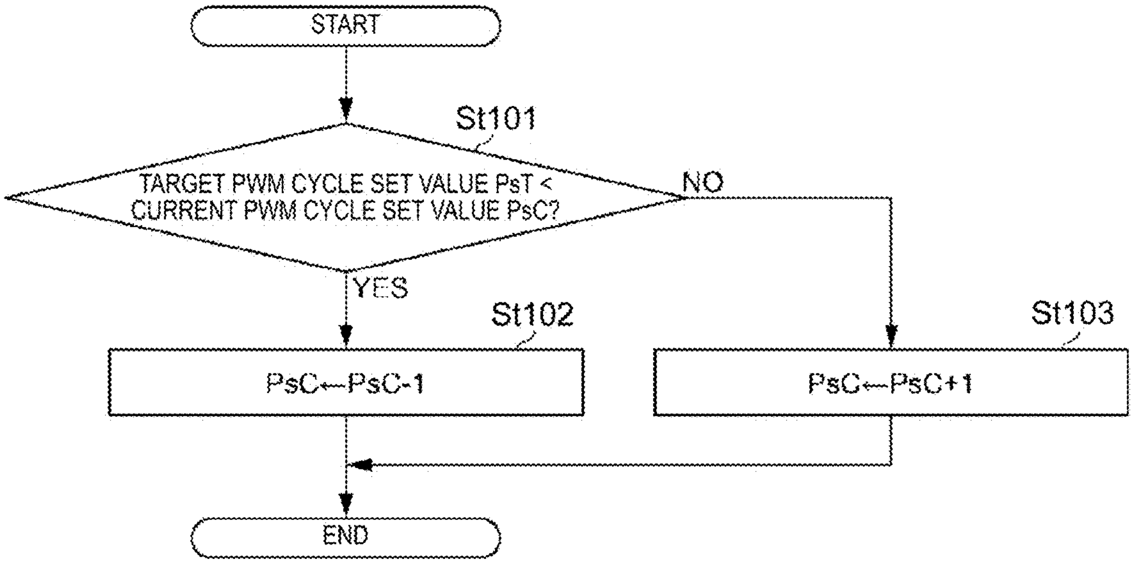
FIG. 5 is a flowchart illustrating an example of a method for adjusting a current PWM cycle set value.

An example of a method for adjusting the current PWM cycle set value will be described with reference to the flowchart of FIG. 5. FIG. 5 is a flowchart illustrating an example of a method for adjusting the current PWM cycle set value.

In step St101, the current PWM cycle set value adjustment unit 355 compares whether or not the target PWM cycle set value PsT is smaller than the current PWM cycle set value PsC.

When the target PWM cycle set value PsT is smaller than the current PWM cycle set value PsC (YES in step St101), the process proceeds to step St102.

In step St102, the current PWM cycle set value adjustment unit 355 decrements the current PWM cycle set value PsC based on the designated change amount "1" referred to from the storage unit 34 for each designated change time.

On the other hand, when the target PWM cycle set value PsT is larger than current PWM cycle set value PsC (NO in step St101), the process proceeds to step St103.

In step St103, the current PWM cycle set value adjustment unit 355 increments the current PWM cycle set value PsC based on the designated change amount "1" referred to from the storage unit 34 for each designated change time.

The value "1" of the designated change amount is an example, and the designated change amount is not limited to this value. For example, when the designated change amount is "2", in step St102, the current PWM cycle set value PsC is decremented by the designated change amount "2" (PsC←PsC−2).

If the designated change amount is too small, it takes a long time to complete the adjustment of the current PWM cycle set value PsC, and it takes a long time to determine the PWM frequency. On the other hand, if the designated change amount is too large, the change in the PWM frequency becomes large, the speed control is disturbed, the controllability is deteriorated, and the vibration may be increased.

In the present embodiment, in step St101, the target PWM cycle set value PsT (1500 counts)>the current PWM cycle set value PsC (416 counts) is satisfied (the determination is NO). Therefore, in step St103, the current PWM cycle set value adjustment unit 355 increments the current PWM cycle set value PsC only by the designated change amount "1" and sets the current PWM cycle set value PsC to 417 counts.

Referring back to FIG. 4, in step St11, the current PWM cycle set value adjustment unit 355 determines the PWM frequency based on the adjusted current PWM cycle set value PsC, and outputs the determined PWM frequency as the PWM frequency signal S6 to the PWM command unit 33.

In the present embodiment, PWM frequency=1÷(PWM cycle set value (417 counts)×1 count time (0.025 μs))=95.9 kHz.

By repeating the processing of FIG. 4, the current PWM cycle set value adjustment unit 355 can gradually bring the current PWM cycle set value PsC closer to the target PWM cycle set value PsT.

Referring back to FIG. 3, the PWM command unit 33 generates the PWM set command signal S3 based on the target rotation speed (target rotation speed signal S1) of the motor 20, the actual rotation speed (actual rotation speed signal S2) of the motor 20, and the PWM frequency (PWM frequency signal S6), and outputs the PWM set command signal S3 to the PWM signal generation unit 36.

Specifically, the PWM command unit 33 compares the target rotation speed with the actual rotation speed, and sets the duty ratio such that the actual rotation speed of the motor 20 corresponds to the target rotation speed. Further, the PWM command unit 33 determines the PWM frequency (PWM cycle) based on the PWM frequency signal S6.

It is preferable that the PWM frequency determination unit 35 sets the designated change time and the designated change amount so that the timing when the PWM command unit 33 generates the PWM set instruction signal S3 and the timing when the PWM frequency is determined are synchronized with each other.

The PWM signal generation unit 36 generates a PWM signal S4 for driving the motor drive unit 2 based on the PWM set instruction signal S3.

The control circuit unit 3 outputs the PWM signal S4 to the motor drive unit 2 as the drive control signal Sd.

The motor drive unit 2 outputs a drive signal to the motor 20 based on the drive control signal Sd to drive the motor 20.

Figure 6:
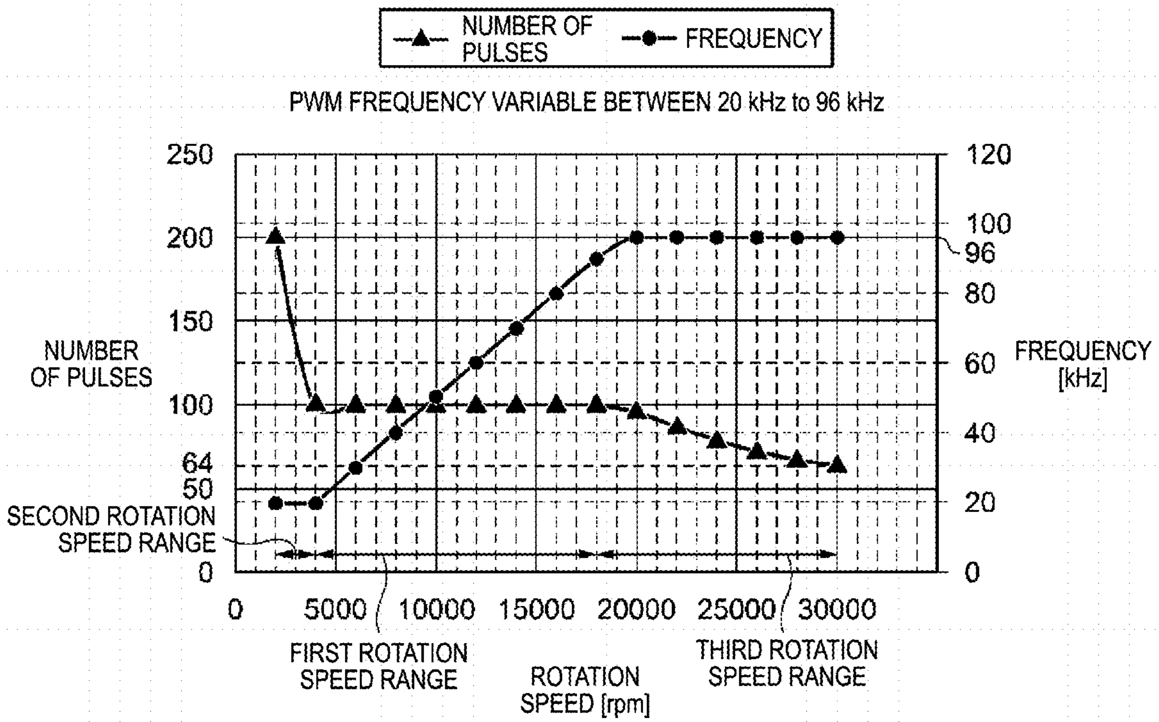
FIG. 6 is a diagram illustrating an example of changes in the PWM frequency and the number of PWM pulses with respect to the rotation speed of the motor in an embodiment of the present invention.

FIG. 6 is a diagram illustrating an example of changes in the PWM frequency and the number of PWM pulses with respect to the rotation speed of the motor in an embodiment of the present invention. Note that, in the present embodiment, the rotation speed ranges (predetermined rotation speed ranged) for rotation of the motor 20 are set between 2000 rpm or more and 30000 rpm or less. A rotation speed range of the motor 20 from 4000 rpm or more and 18000 rpm or less is referred to as a first rotation speed range, a rotation speed range of the motor 20 from 2000 rpm or more and less than 4000 rpm is referred to as a second rotation speed range, and a rotation speed range of the motor 20 from more than 18000 rpm and 30000 rpm or less is referred to as a third rotation speed range.

As illustrated in FIG. 6, when the rotation speed of the motor 20 is in the first rotation speed range (4000 rpm or more and 18000 rpm or less), the PWM frequency is controlled to be in a predetermined range of 20 kHz or more and 96 KHz or less, and the number of PWM pulses is controlled to be 100 pulses being desired.

When the rotation speed of the motor 20 is in the second rotation speed range (2000 rpm or more and less than 4000 rpm), the number of PWM pulses is the maximum of 200 pulses at 2000 rpm, and exceeds the desired pulse number (100 pulses). However, with this number of PWM pulses, the switching loss of the switching elements of the inverter circuit 2*a* does not increase to such an extent that the switching loss becomes a problem, and therefore, the drive efficiency of the motor 20 can be maintained at a predetermined value or more.

When the rotation speed of the motor 20 is in the third rotation speed range (more than 18000 rpm and 30000 rpm or less), the number of PWM pulses gradually decreases from 100 pulses to 64 pulses as the rotation speed increases. However, if the number of PWM pulses is within this range, there is no particular problem in generating a smooth sine wave waveform.

The lowest PWM frequency (lower limit value) in the rotation speed range of the motor 20 is 20 kHz (an example of the first value) when the rotation speed of the motor 20 is in the second rotation speed range (2000 or more and 4000 rpm or less). As described above, since the lower limit value of the PWM frequency is set to a frequency in an inaudible range incapable of being heard by human hearing, generation of noise can be prevented.

The highest PWM frequency (upper limit value) in the rotation speed range of the motor 20 is 96 kHz (an example of the second value) when the rotation speed of the motor 20 is 20000 rpm or more and 30000 rpm or less in the third rotation speed range. In this way, by setting the upper limit value of the PWM frequency to 96 kHz, the switching loss of the switching elements of the inverter circuit 2*a* does not increase, and therefore the drive efficiency of the motor 20 can be maintained at a predetermined value or more.

As described above, in the present invention, the PWM frequency is adjusted so that the PWM frequency of the drive control signal Sd is within a predetermined range and the number of PWM pulses per one cycle of the electrical angle of the motor 20 is a desired value in the first rotation speed range of the predetermined rotation speed ranges of the motor, and the PWM frequency is within a predetermined range in rotation speed ranges (second and third rotation speed ranges) other than the first rotation speed range. Whereby, it is possible to increase the drive efficiency of the motor and suppress the generation of vibration.

REFERENCE SIGNS LIST

1 Motor drive control device, 2 Motor drive unit, 2*a* Inverter circuit, 2*b* Pre-drive circuit, 3 Control circuit unit, 31 Rotation speed calculation unit, 32 Speed command analysis unit, 33 PWM command unit, 34 Storage unit, 35 PWM frequency determination unit, 351 Designated time measurement unit, 352 Cycle acquisition unit, 353 Target PWM cycle set value calculation unit, 354 Target PWM cycle set value correction unit, 355 Current PWM cycle set value adjustment unit, 36 PWM signal generation unit, 4 External device, 20 Motor, 25 Hall element, PsC Current PWM cycle set value, PsT Target PWM cycle set value, PsMin Minimum PWM cycle set value, PsMAX Maximum PWM cycle set value, Sc Speed command signal, Sd Drive control signal, S1 Target rotation speed signal (target rotation speed), S2 Actual rotation speed signal (actual rotation speed), S3 PWM set instruction signal, S4 PWM signal, S5 Parameter information, S6 PWM frequency signal, Hu, Hv, Hw Hall signal

The invention claimed is:

1. A motor drive control device comprising:

a control circuit unit configured to output a drive control signal for PWM-driving a motor; and a motor drive unit configured to drive the motor based on the drive control signal, wherein the control circuit unit adjusts a PWM frequency of the drive control signal such that the PWM frequency is within a predetermined range and the number of PWM pulses per one cycle of an electrical angle of the motor is a desired value in a first rotation speed range of predetermined rotation speed ranges of the motor, and the PWM frequency is within the predetermined range in a rotation speed range other than the first rotation speed range, and wherein the control circuit unit includes:

a storage unit configured to store a parameter for adjusting the PWM frequency, the parameter including a designated number of pulses being a predetermined number of PWM pulses per the one cycle of an electrical angle, a minimum PWM cycle set value corresponding to a first value of the PWM frequency, and a maximum PWM cycle set value corresponding to a second value of the PWM frequency; and a PWM frequency determination unit configured to determine the PWM frequency to be adjusted based on the parameter, wherein the PWM frequency determination unit is configured to:

acquire the one cycle of an electrical angle based on a position detection signal indicating a rotation position of the motor;

calculate a target PWM cycle set value corresponding to a target PWM frequency based on the one cycle of the electrical angle and the designated number of pulses;

compare a current PWM cycle set value corresponding to a current PWM frequency with the target PWM cycle set value;

when the current PWM cycle set value and the target PWM cycle set value do not match, compare the target PWM cycle set value with the maximum PWM cycle set value and the minimum PWM cycle set value;

correct the target PWM cycle set value based on a comparison result; and determine the PWM frequency by adjusting the current PWM cycle set value based on the corrected target PWM cycle set value.

2. The motor drive control device according to claim 1, wherein the control circuit unit adjusts the PWM frequency to a first value or more in the predetermined rotation speed ranges.

3. The motor drive control device according to claim 2, wherein the first value of the PWM frequency is a frequency in an inaudible range incapable of being heard by human hearing.

4. The motor drive control device according to claim 2, wherein the control circuit unit adjusts the PWM frequency to be equal to or less than a second value larger than the first value in the predetermined rotation speed ranges.

5. The motor drive control device according to claim 4, wherein the second value of the PWM frequency is a frequency, and a drive efficiency of the motor is maintainable at a predetermined value or more at the frequency.

6. The motor drive control device according to claim 1, wherein the PWM frequency determination unit comprises:

correcting the minimum PWM cycle set value to the target PWM cycle set value when the target PWM cycle set value is larger than the minimum PWM cycle set value; and correcting the maximum PWM cycle set value to the target PWM cycle set value when the target PWM cycle set value is smaller than the maximum PWM cycle set value.

7. The motor drive control device according to claim 1, wherein the parameter stored in the storage unit further includes:

a designated change time for setting an adjustment interval of the PWM frequency; and a designated change amount for setting an adjustment amount of the PWM frequency.

8. The motor drive control device according to claim 7, wherein the PWM frequency determination unit includes:

a designated time measurement unit configured to determine whether the designated change time has elapsed;

a cycle acquisition unit configured to acquire the one cycle of an electrical angle;

a target PWM cycle set value calculation unit configured to calculate the target PWM cycle set value;

a target PWM cycle set value correction unit configured to correct the target PWM cycle set value; and a current PWM cycle set value adjustment unit configured to adjust the current PWM cycle set value based on the designated change amount for each of a plurality of the designated change times.

9. The motor drive control device according to claim 7, wherein the control circuit unit includes a PWM command unit configured to generate a PWM set instruction signal based on a target rotation speed of the motor, an actual rotation speed of the motor, and the PWM frequency, and the PWM frequency determination unit sets the designated change time and the designated change amount such that a timing when the PWM command unit generates the PWM set instruction signal and a timing when the PWM frequency is determined are synchronized with each other.

10. A motor drive control method executed by a motor drive control device, the motor drive control device comprising:

a control circuit unit configured to output a drive control signal for PWM-driving a motor; and a motor drive unit configured to drive the motor based on the drive control signal, the motor drive control method comprising:

adjusting a PWM frequency of the drive control signal such that the PWM frequency is within a predetermined range and the number of PWM pulses per one cycle of an electrical angle of the motor is a desired value in a first rotation speed range of predetermined rotation speed ranges of the motor, and the PWM frequency is within the predetermined range in a rotation speed range other than the first rotation speed range;

acquiring the one cycle of an electrical angle based on a position detection signal indicating a rotation position of the motor;

calculating a target PWM cycle set value based on the one cycle of the electrical angle and a designated number of pulses being a predetermined number of PWM pulses per the one cycle of an electrical angle;

comparing a current PWM cycle set value corresponding to a current PWM frequency with the target PWM cycle set value;

when the current PWM cycle set value and the target PWM cycle set value do not match, comparing the target PWM cycle set value with a maximum PWM cycle set value and a minimum PWM cycle set value;

correcting the target PWM cycle set value based on a comparison result; and determining the PWM frequency by adjusting the current PWM cycle set value based on the corrected target PWM cycle set value.

* * * * *